United States Patent [19]
Aylward et al.

[11] Patent Number: 4,984,273
[45] Date of Patent: Jan. 8, 1991

[54] ENHANCING BASS

[75] Inventors: J. Richard Aylward, W. Newton; Timothy Holl, Medway; William J. Keezer, Sherborn, all of Mass.

[73] Assignee: Bose Corporation, Framingham, Mass.

[21] Appl. No.: 401,998

[22] Filed: Aug. 31, 1989

Related U.S. Application Data

[63] Continuation of Ser. No. 274,381, Nov. 21, 1988.

[51] Int. Cl.$^5$ .................................................. H04S 1/00
[52] U.S. Cl. ............................................ 381/1; 381/98
[58] Field of Search ........................... 381/1, 27, 24, 98

[56] References Cited

U.S. PATENT DOCUMENTS 4,024,344  5/1977  Dolby et al. .......................... 381/27
4,503,554  3/1985  Davis ...................................... 381/1

Primary Examiner—Forester W. Isen
Attorney, Agent, or Firm—Fish and Richardson

[57] ABSTRACT

A circuit controls the sound pressure level produced by a separate bass transducer in a multi-channel audio system having a number of upper frequency channels such that the perceived frequency response of the system remains substantially constant.

1 Claim, 3 Drawing Sheets

ENHANCING BASS

This application is a continuing application of application Ser. No. 07/274,381 filed Nov. 21, 1988.

The present invention relates in general to enhancing bass and more particularly concerns novel apparatus and techniques for enhancing bass in a multichannel audio or audio for video system.

In a multi-channel audio or audio-for-video system, it may be advantageous to reproduce only the mid and high frequency components of the program material from separate loudspeakers used for each channel and to reproduce the bass content of the program material for all channels from a single bass transducer. In a two-channel stereo system, the bass may be obtained by summing the bass content of the left and right channels, electrically or acoustically. If, however, there are additional channels of information, such as surround or ambience, simply summing the bass portions of left and right channels is unsatisfactory because the loudness of these added channels relative to the normal channel(s) will be program-material-dependent.

The circuitry according to the invention controls the sound pressure level produced by a separate bass transducer such that the perceived frequency response of the system remains constant regardless of how many such channels are active or of how loud they are playing relative to the normal channel(s).

An audio-for-video system described in copending application Ser. No. 07/274,381 filed Nov. 21, 1988, is a multi-channel system which is fed by a standard stereo signal but which then derives signals to drive speakers for a left channel, right channel, ambience channels and a bass channel. The system has a single bass transducer which is driven by the sum of left and right channels and which covers the frequency range up to approximately 200 Hz. The stereo information is handled by two forward firing upper frequency drivers which handle the frequency range from approximately 200 Hz to 20,000 Hz. Finally, "ambience" or spaciousness is added by two further upper frequency drivers operating from approximately 200 Hz to 20,000 Hz and which are fed by the difference or (L-R) signal, these ambience drivers providing sound to the listener via reflections from the room boundaries. In an embodiment described in the above-mentioned patent application, those ambience drivers are also driven such that the overall gain from input to sound pressure level in the room is approximately 5 dB greater than that of the left and right channels.

In this system, the circuitry according to the invention dynamically adjusts the gain of the bass channel amplifier to provide a bass level in the room such that the perceived frequency response of the system does not vary with program material.

Other features and advantages of the invention will become apparent from the following description when read in connection with the accompanying drawings in which.

Figure 1:
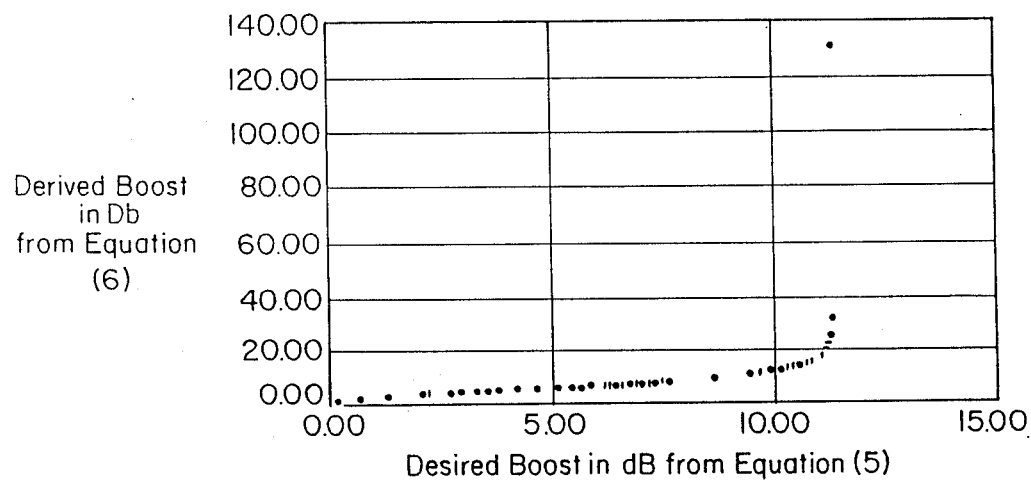
FIG. 1 is a graphical representation of the relationship between bass boosts of alternate embodiments of the invention.

Before referring to specific figures of the drawings, it is helpful to consider characteristics of a system without the invention and the mathematical foundation for the invention.

In a system containing a channel (or channels) that has information which differs from the stereo signals but is derived from them, the magnitude of signal in that channel will depend on the degree of correlation between left and right channels in the program material being reproduced. Different program material will yield different levels in the derived channel, and hence the transfer function from input to listener will vary with program material. Without circuitry according to the invention, this variation in program material will only affect the sound pressure level in the frequency range over which the left, right and derived channels operate, not in the bass range covered by the single transducer. This mode of operation will be better understood by considering the following two situations: (1) a normal stereo signal where the content of left and right channel signals are different, and (2) a monophonic signal where the contents of the two channels are identical.

Consider first a stereo signal applied to the system described for an input signal of magnitude L at the left channel and magnitude R at the right channel. The transfer function from electrical input to sound pressure level at the listeners' ears can be considered to be the same for each upper frequency driver in the system. The following sound pressure levels occur at the listener's location:

Left channel upper frequency driver . . . L'
Right channel upper frequency driver . . . R'
1st Ambience upper frequency driver . . . A(L-R)'
2nd Ambience upper frequency driver . . . A(R-L)' where L' signifies the acoustic output generated from L allowing for the transfer function mentioned above, and where A is any extra gain and equalization included in the ambience channel amplifier. Note that L, R, L' and R' are all complex numbers since all signals have both magnitude and phase. These sound pressure levels will sum in an uncorrelated fashion as the wavelengths involved are short compared to typical distances between drivers and driver-to-listener distances. The resultant sound pressure level will therefore be:

$$\sqrt{L'^2 + R'^2 + \{A(L-R)'\}^2 + \{A(R-L)'\}^2} \quad (1)$$

which equals $$\sqrt{L'^2 + R'^2 + 2\{A(L-R)'\}^2} \quad (2)$$

The program material below 200 Hz will, as stated earlier, be handled by the single bass channel. The level of acoustic signal this channel produces should thus be appropriate for the sound pressure level given above and the gain chosen accordingly.

Now consider what happens when the system is fed a monophonic signal. In this case the signals in both channels are equal, or $$R = L. \quad (3)$$

From expression (2) the sound pressure level produced by the upper frequency drivers becomes $$\sqrt{(L'^2 + R'^2)} \quad (4)$$

This level is lower than the level for a stereo input given in expression (2) and so, for a correct tonal balance, a lower level should be produced by the bass channel. In other words, the bass channel should have a lower gain when used with monophonic material than it has when used with stereo material.

If the gain in the bass channel is adjusted to be correct for a monophonic signal, the extra gain needed in the bass channel when the system is fed a stereo signal may be found by dividing expression (2) by expression (4), giving a gain boost of $$\frac{\sqrt{(L'^2 + R'^2 + 2\{(L - R)'\}^2)}}{\sqrt{(L'^2 + R'^2)}} \quad (5)$$

The boost provided by expression (5) will be appropriate for any ambience level, not just for the two situations described. The greater the ambience signal, then the greater the bass boost, so that the overall tonal balance of the system will not be dependent on the amount of correlation between left and right channels.

A circuit processing signals in accordance with expression (5) may be embodied in a system having a detector for the left channel, a detector for the right channel, and a detector for the (L-R) channel.

The system may be embodied with only two detectors processing signals in accordance with the following expression:

$$\frac{(L + R) + B(L - R)}{(L + R)} \quad (6)$$

where B is a constant whose value depends on the gain A in the ambience channel. Expression (6) is not mathematically the equivalent of expression (5), but can be shown to give the same results over most of the range of required boost.

FIG. 1 shows the relationship between the desired boost of expression (5) and the boost generated by expression (6) for a system in which the gain of the ambience channel A is the equivalent of 5 dB and the constant B is unity. Over the range of boost of 0 dB to 9 dB the two are essentially the same. Above 9 dB, the implementation with fewer detectors gives excessive boost approaching infinite boost in the case when the two channels are equal and completely out of phase with each other.

Figure 2:
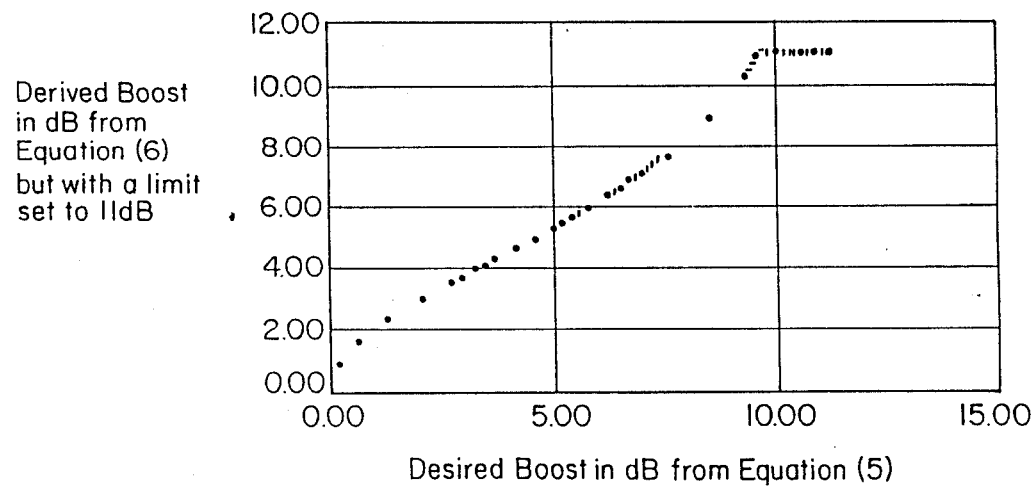
FIG. 2 shows a similar relationship but imposing a limit on the available gain from one of the embodiments.

By placing a limit on the amount of boost that the circuit can provide, the results of the two circuits can be made close enough that the differences between them are inaudible. This result is shown in FIG. 2 where the maximum gain of the two-detector circuit is 11 dB.

Figure 3:
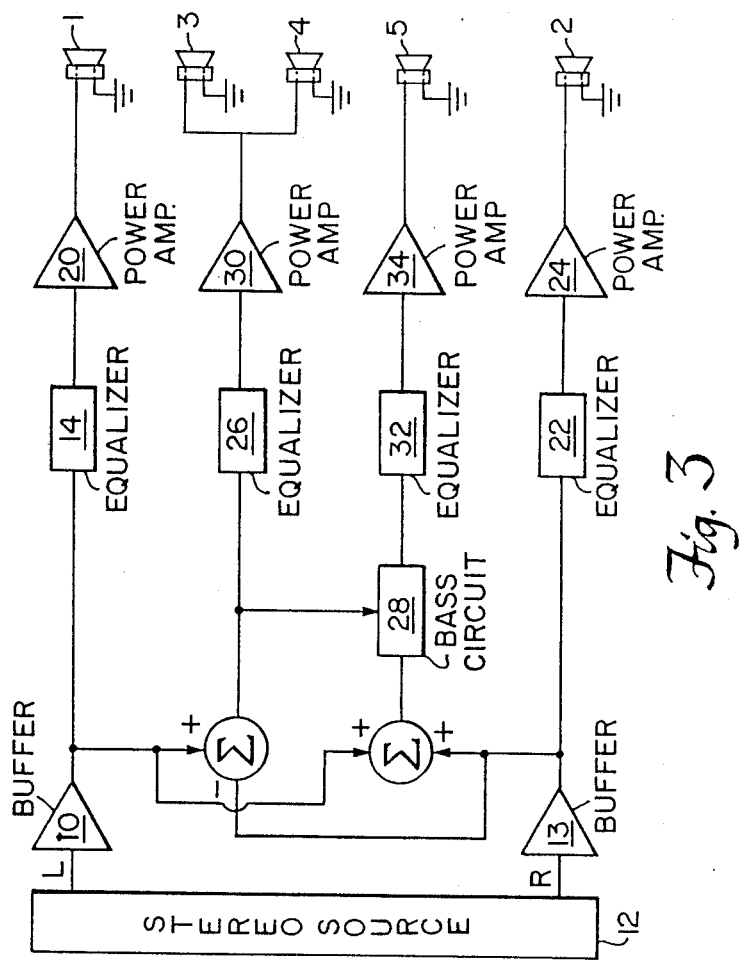
FIG. 3 is a block diagram showing the logical arrangement of an amplifier with five speakers corresponding substantially to FIG. 3 of the aforesaid parent application embodying the apparatus for improving bass according to the invention.

Referring to FIG. 3, there is shown a block diagram illustrating the logical arrangement of a system corresponding substantially to the system of FIG. 3 in the aforesaid parent application. The left and right channels from stereo source 12 labeled L and R, respectively, are inputted to buffers 10 and 13, respectively. Buffer 10 outputs a signal to equalizer 14, the positive input of subtraction circuit 16 and addition circuit 18. Equalizer 14 outputs a signal through left main power amplifier 20 to the positive input of left speaker 1; the negative input of speaker 1 is connected to ground. Buffer 13 outputs a signal to equalizer 22, the negative input of subtraction circuit 16 and addition circuit 18. Equalizer 22 outputs a signal through right main power amplifier 24 to the positive input of right speaker 2; the negative input of speaker 2 is connected to ground.

The output of subtraction circuit 16 is inputted to equalizaer 26 and to bass circuit 28. Equalizer 26 outputs a signal to ambience power amplifier 30. The output of power amplifier 30 is inputted to the positive input of left ambience speaker 3 and the negative input of right ambience speaker 4. The negative input of speaker 3 and the positive input of speaker 4 are connected to ground.

The output of addition circuit 18 is inputted to bass circuit 28, which enables bass from L and R channels to drive speaker 5. Bass circuit 28 outputs a signal through equalizer 32 and bass power amplifier 34 to speaker 5.

Speakers 1-4 are e.g. 5 cm midrange (8 ohm) tweeters mounted in sealed enclosures with a 0.6 liter internal volume and a pass band of 180 Hz-15 KHz. Speaker 5 is e.g. a 15 cm woofer (1 Ohm) in an enclosure of the type described in U.S. Pat. No. 4,549,631 having a 3.3 liter volume, 50 to 150 Hz tuning, and a pass band of 40 Hz-180 Hz.

Figure 4:
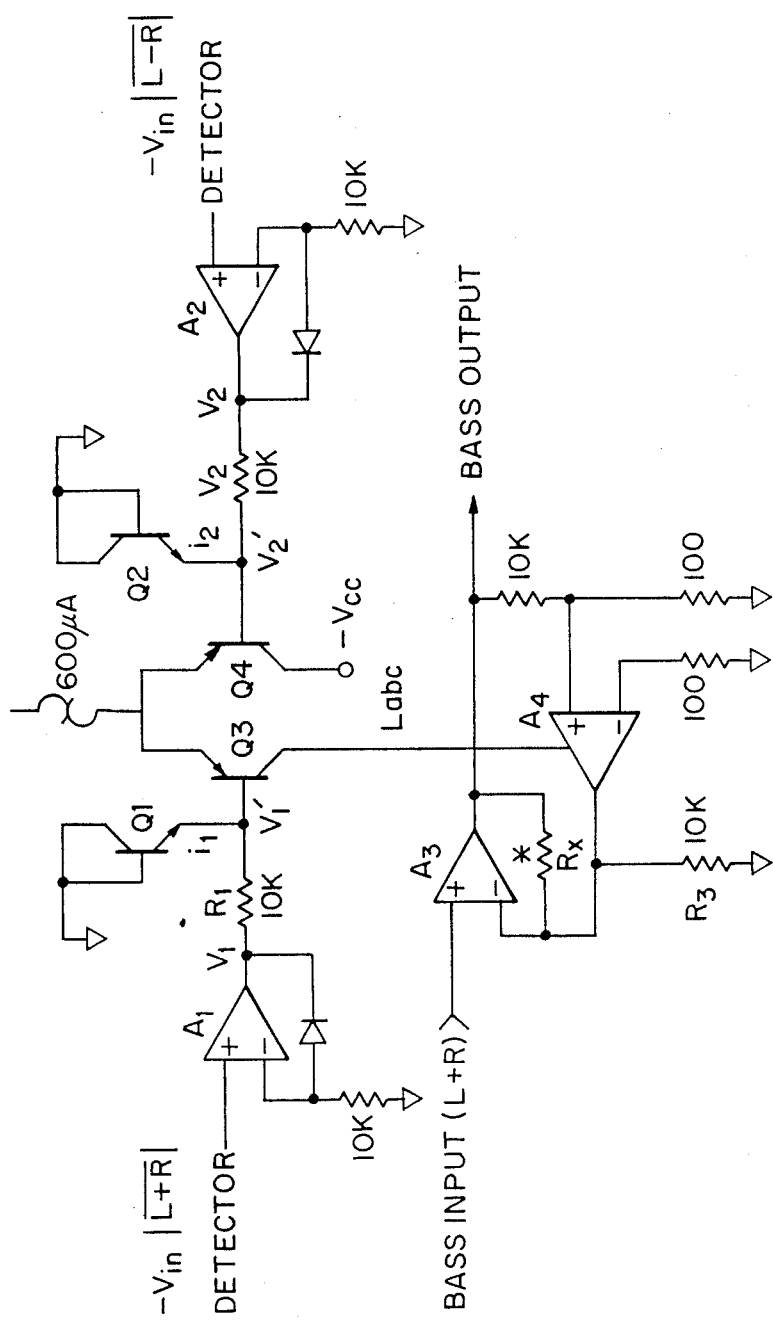
FIG. 4 is a combined block-schematic circuit diagram of an actual embodiment of the invention.

Referring to FIG. 4, there is shown a combined block-schematic circuit diagram of an embodiment of the invention. The circuit embodiment of FIG. 4 comprises the following elements. There is a level detection means for generating two or more signals in response to two or more bi-polar input signals, and whose outputs are equivalent to the rms, average, or peak value of said input signals. Said level detection means need not be unipolar, and said input signals need not be correlated or restricted to any previously mentioned bandwidths. Said input signals may be generated from a variety of sources, including but not limited to, laser disc, compact disc, tape, off air, phonograph or other signal source.

The signal at the output of combiner 16 of FIG. 3 may be detected to provide the L-R magnitude signal at the input of amplifier $A_2$. The output of combiner 18 may be detected to provide the L+R magnitude applied to the input of amplifier $A_1$ and may be delivered to the input of amplifier $A_3$. The Bass Output may then be applied to equalizer 32 of FIG. 3.

There is a means for generating a log-linear (in decibels) voltage in response to the output of said level detection means.

There is means for generating a difference signal in response to the output of said log-linear voltage generators.

There is a variable gain element, whose voltage gain in dB is linearly controlled by said difference signal generator. Said variable gain element amplitude modulates the level of a third input signal, which need not be correlated with either of said first or second signals. Said third signal need not be restricted in bandwidth.

A variable gain element, comprised of operational amplifier A3 and variable transconductance amplifier A amplitude modulates a bass channel signal according to equation (6). The gain, $A_v$, of the variable gain element is described by:

$$A_v = 20 \log_{10} \frac{100}{g_m i_{abc} R_L} \quad (7)$$

where $g_m$ at 25° C. is approximately 16.2, $i_{abc}$ is the current generated by transistor Q3, and $R_L$ is 10k.

Transistors Q3 and Q4, generate a current proportional to the difference between voltages $V_2'$ and $V_1'$ on respective bases. Transistors Q3 and Q4 operate from a constant current of 600 µA.

Transistors Q1 and Q2 operate as diodes carrying currents $i_1$ and $i_2$, respectively, and generate a voltage which is described by:

$$V_1' = Kt/q \ln \frac{i_1}{i_s} \quad (8)$$

$$V_2' = Kt/q \ln \frac{i_2}{i_s} \quad (9)$$

where $Kt/q$ @ 25° C. is approximately 0.026 and $i_s$ is a device controlled parameter, in this case $10^{-14}$ amperes.

$$i_1 = V_1/R_1$$

$$i_2 = V_2/R_2$$

and $V_1$ = the average value of the L+R signal content.
$V_2$ = the average value of the L-R signal content and $i_3 + i_{abc} = 600$ µA.

Further, the voltages at $V_1'$ and $V_2'$, are log-linear in nature, and follow a well established behavior pattern. The scale factor of this behavior is restricted to 3 mv/decibel of input current i. $i_{abc}$ may be found by:

$$600 A - \left(\frac{Vbe\ 03}{.026}\right)^{Ln-1} \cdot (10^{-14})$$

Note that for $V_1' = V_2'$, $i_{abc} - 300$ µA, and $i_3 = 300$ µA, L−R=L+R.

For this condition, the variable gain cell (A3→A4) will have a voltage gain of 6 db. The absolute limit of available gain may be controlled by the inclusion of resistor $R_x$, wherein as $i_{abc}$ approaches 0 A, the voltage gain of the circuit is limited to:

$$1 + \frac{R_x}{R_3}$$

For $R_x = 61.9K$ and $R_3 = 10K$, the maximum bass boost is substantially 17 db in an actual circuit.

Similar circuitry may be used in any situation where multiple derived channels of audio are used over most of the audio bandwidth to enable a single bass transducer to provide the appropriate amount of bass, regardless of number of channels actually reproducing sound. For example, consider surround sound. Surround sound decoders provide a rear channel of sound which is derived from the left and right channels of encoded movies. Speakers to provide this rear channel can be made extremely small only if they don't have to reproduce low frequencies. However, simply summing the bass portion of the surround signal into an existing bass enclosure provides inaccurate sound balance. This unbalance is because, like ambience, surround information is derived from the difference between left and right signals. In addition, the surround information signal is normally passed through a delay line to delay it by appoximately 20 milliseconds. A simple summing of delayed difference signal low frequencies with normal stereo low frequencies would give a comb-filtered resultant of unpredictable amplitude.

Using circuitry according to the invention, an extra boost can be delivered to the bass channel (or channels) that is proportional to the increase in sound pressure level produced in the room when the surround channel is active. As in the case of ambience, the precise boost will maintain the perceived frequency response of the overall system constant regardless of the actual amount of surround in any piece of program material, so that if one piece of software provides a louder surround signal than another, then the bass too will be proportionately louder.

Circuitry is not restricted to providing dynamically varying boost in a separate bass amplification channel. The principle of the invention can be used with the bass portion of full range speakers. An example for such usage is provided by the use of small surround speakers covering only mid and high frequencies with full range speaker systems for the front channels. In this case, the circuitry may boost the bass portion only of the signals fed to the front speakers, the frequency range of such boost being determined by the low frequency limit of the surround speakers. The result is dynamic equalization of the front-left and front-right channels so that they provide, in addition to the left and right bass, bass that is proportional to the increase in sound pressure level in the room caused by the addition of the surround speakers.

Other embodiments are within the claims.

What is claimed is:

1. In a multichannel audio system, apparatus for improving bass comprising,
   a plurality of upper frequency channels for radiating upper frequency sound including L and R signals, an L-R signal and an R-L signal,
   a lesser number of bass channels for radiating a sound signal characterized by spectral components in the bass frequency range,
   detection circuitry providing detected signals representative of the contemporary amplitude of the L-R and R-L signals in the upper frequency channels and said L signal+said R signal,
   a processing circuit for processing the detected signals to provide a bass gain signal,
   and a gain controller responsive to the bass gain signal for controlling the bass channel gain so that the perceived frequency response of the overall system comprising said upper frequency channels and said lesser number of bass channels remains substantially constant in the presence of variable signal levels in the different upper frequency channels,
   said processing circuit comprising,
   a first circuit for receiving a first detected signal representative of the magnitude of said L signal+said R signal,
   a second circuit for receiving a second detected signal representative of the magnitude of said L signal−said R signal,
   a combining circuit for combining said first and second detected signals to provide said bass gain signal,
   said lesser number of bass channels comprising a variable gain amplifier having an input for receiving the bass spectral components of said L signal+said R signal and an output and a gain control input,
   said gain control input receiving said bass gain signal.

* * * * *